(No Model.)

T. SELLER.
DIBBLE.

No. 385,324. Patented June 26, 1888.

Witnesses.
Chas. R. Burr.
A. J. Stuart.

Inventor.
Thomas Seller.
by Church & Church
his Attorneys.

UNITED STATES PATENT OFFICE.

THOMAS SELLER, OF VERSAILLES, KENTUCKY, ASSIGNOR OF ONE-HALF TO WESLEY YOUNG, OF DAYTON, OHIO.

DIBBLE.

SPECIFICATION forming part of Letters Patent No. 385,324, dated June 26, 1888.

Application filed September 5, 1887. Serial No. 248,845. (No model.)

*To all whom it may concern:*

Be it known that I, THOMAS SELLER, a citizen of the United States, and a resident of Versailles, in the county of Woodford and State of Kentucky, have invented a new and Improved Dibble; and I do hereby declare the following to be a full, clear, and exact description of the same, reference being had to the accompanying drawings, and to the figures and letters of reference marked thereon.

My improved implement or "dibble" is designed particularly for use in the construction of hedge fences, being employed in the setting or planting of the plants for such fences.

Figure 1:
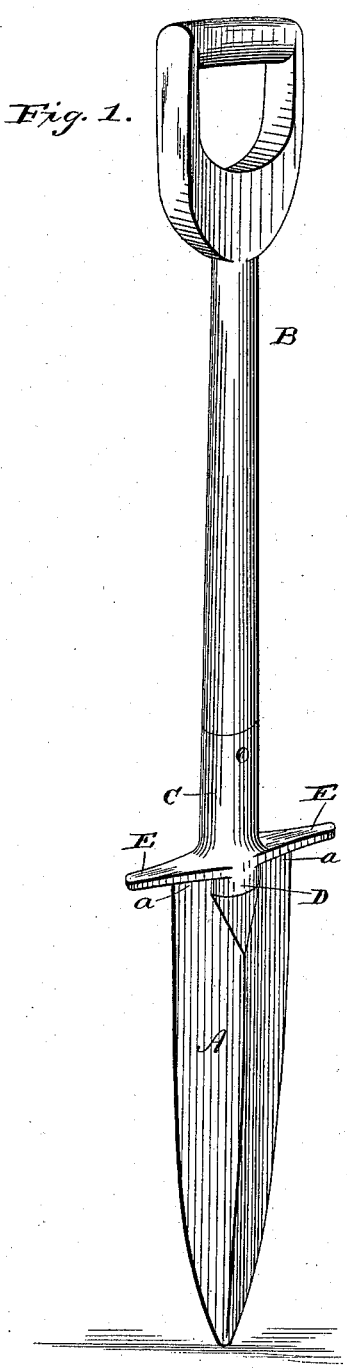
Figure 2:
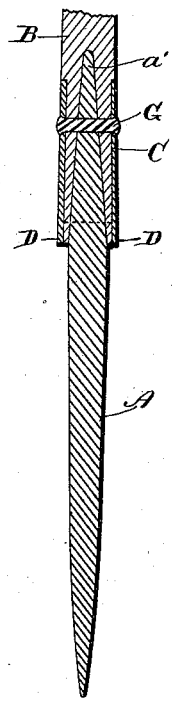

In the drawings, Figure 1 represents a perspective view of the implement; Fig. 2, a partial longitudinal sectional view of the same, and Fig. 3 a cross-sectional view of the blade thereof.

Similar letters of reference in the several figures indicate the same parts.

Figure 3:

The blade A of the implement is quite long, straight, two-edged, and pointed, and in cross-section is preferably diamond-shaped, as shown in Fig. 3. It is provided with shoulders *a a* at its upper portion and with a shank, *a'*.

The handle B is made straight and is of the variety known as a "D-handle." Upon its end in which the shank of the blade is inserted is secured a stout ferrule or socket, C, which is provided with lugs or projections D D, for confining the upper portion of the blade A and preventing its turning, and with stout laterally-projecting arms E E, which serve as foot-rests, upon which the user may press with his foot to force the implement into the ground.

It will be observed that these arms or foot-rests E E project beyond the edges of the blade, which is quite narrow and would not of itself afford a sufficient bearing for the foot, said arms being supported and prevented from being broken off by the top of the blade or shoulders *a*, upon which they rest. The blade itself, as before stated, is preferably diamond shape in cross-section, but as the shank *a'* is relatively thinner than the central part of the blade the latter is flattened on each side near the top and gradually tapered in to form the said shank. This construction also gives a flat seat for the confining-lugs on either side, as will be readily understood upon an inspection of Fig. 1.

In using the implement to set a plant the operator grasps it by its handle and with his foot presses the blade into the ground to the required depth. Then by one or two sidewise motions of the handle the opening cut by the blade is opened or widened, the blade withdrawn, and the plant inserted, after which the earth is closed around the plant by forcing the blade into the ground again near the plant and crowding the earth toward the plant by a movement of the handle, as will be readily understood.

The form of the blade, it will be observed, is such as to render it a very easy matter to force it into the ground and at the same time give it the degree of lateral stiffness necessary for it to have in order to withstand the strain to which it is subjected when in use.

In order to render the connection between the parts more substantial and prevent them by any possibility from becoming loose, I preferably pass one or more rivets, G, through the socket, handle, and the shank of the blade, as shown in Fig. 2.

Having thus described my invention, what I claim as new is—

1. In the herein-described dibble, the combination of the straight-pointed blade substantially diamond shape in cross-section, the straight handle, and the socket having the central downwardly-projecting lugs D, embracing the blade at the center on either side, and the arms E, made integral with said socket and extending outward beyond the edges of the blade, forming foot-rests for the operator, lying on and supported by the top of said blade, substantially as and for the purpose set forth.

2. In the herein-described dibble, the combination, with the straight handle having the socket on its lower end provided with the central downwardly-projecting lugs embracing the flat portion of the blade on each side, and the laterally-projecting arms forming foot-rests projecting beyond the edges of the blade formed integral therewith, the blade substantially diamond shape in cross-section with its upper part flattened and tapered to form the shank, and the rivet passing through the socket, handle, and shank for uniting the parts, substantially as and for the purpose set forth.

THOS. SELLER.

Witnesses:
K. G. MADERIA,
W. C. PARKER.